US008926254B2

(12) United States Patent
Pocobello et al.

(10) Patent No.: US 8,926,254 B2
(45) Date of Patent: Jan. 6, 2015

(54) AUTOMOTIVE VEHICLE HAVING A POWER-ACTUATED RAMP

(75) Inventors: Michael A. Pocobello, Ellsworth, MI (US); David Barnhart, Clarkston, MI (US)

(73) Assignee: Mobility Ventures LLC, South Bend, IN (US)

( * ) Notice: Subject to any disclaimer, the term of this patent is extended or adjusted under 35 U.S.C. 154(b) by 825 days.

(21) Appl. No.: 12/426,274

(22) Filed: Apr. 19, 2009

(65) Prior Publication Data

US 2009/0274542 A1    Nov. 5, 2009

Related U.S. Application Data

(63) Continuation-in-part of application No. 11/521,587, filed on Sep. 15, 2006, now abandoned.

(60) Provisional application No. 60/734,284, filed on Nov. 8, 2005.

(51) Int. Cl.
| | | |
|---|---|---|
| *B60P 1/00* | (2006.01) | |
| *A61G 3/08* | (2006.01) | |
| *B62D 31/00* | (2006.01) | |
| *B60R 3/02* | (2006.01) | |
| *A61G 3/06* | (2006.01) | |

(52) U.S. Cl.
CPC .............. *A61G 3/061* (2013.01); *A61G 3/0808* (2013.01); *A61G 2003/067* (2013.01); *B62D 31/00* (2013.01); *B60R 3/02* (2013.01); *Y10S 414/134* (2013.01)
USPC ........................................... 414/537; 414/921

(58) Field of Classification Search
CPC ............ B60P 1/43; B60P 1/431; B60P 1/435; B65G 69/30; B65G 69/287; B65G 69/28; B65G 67/02; B65G 2812/085; B63B 27/14; A61G 3/061; A61G 3/0808; A61G 3/06; A61G 3/0209

USPC .................. 414/537, 522, 921; 14/71.1, 71.3; 193/38, 39, 41
See application file for complete search history.

(56) References Cited

U.S. PATENT DOCUMENTS

| | | | |
|---|---|---|---|
| 1,622,248 A | 12/1926 | Smith et al. | |
| 1,717,303 A | 6/1929 | Barclay | |

(Continued)

FOREIGN PATENT DOCUMENTS

| | | |
|---|---|---|
| EP | 0 390 431 A2 | 10/1990 |
| JP | 5-77670 | 3/1993 |
| JP | 2004-345450 | 12/2004 |

OTHER PUBLICATIONS

May 14, 2008 International Prelimininary Report on Patentability for PCT/US2006/043441.

(Continued)

*Primary Examiner* — Gregory Adams
*Assistant Examiner* — Glenn Myers
(74) *Attorney, Agent, or Firm* — Barnes & Thornburg LLP (57) ABSTRACT

An automotive vehicle having a power-actuated ramp includes a vehicle body having a roof, front portion, rear portion, opposed side portions, and a floor that cooperate to define a passenger area. At least one door provides boarding and alighting relative to the passenger area, which defines a flat area of the floor adapted to receive a mobility device. A ramp cartridge is operatively supported by and received within a recessed section of the floor and includes a frame assembly having a main deck and cooperating with and being substantially coplanar with the flat area to provide a substantial flatness of the floor, a ramp assembly having a ramp that is adapted to be retained in a stored position below the main deck, and a drive assembly adapted to actuate the ramp between the stored position and a first ramp position and between the stored position and a second ramp position.

18 Claims, 6 Drawing Sheets

(56) References Cited

U.S. PATENT DOCUMENTS

| | | | | |
|---|---|---|---|---|
| 2,261,693 | A | 11/1941 | Mathauer | 296/37 |
| 2,495,520 | A | 1/1950 | Grimm | 296/65 |
| 2,963,106 | A | 12/1960 | Sampietro | 180/70 |
| 3,214,211 | A | 10/1965 | Setina | 296/24 |
| 3,547,217 | A | 12/1970 | Garza | 180/112 |
| 3,941,261 | A | 3/1976 | Ricci | 214/85 |
| 4,081,091 | A * | 3/1978 | Thorley | 414/545 |
| 4,688,843 | A | 8/1987 | Hall | 296/65 R |
| 4,847,972 | A | 7/1989 | Anderson et al. | 29/401.1 |
| 4,898,508 | A | 2/1990 | Hayata | 414/476 |
| 4,900,217 | A * | 2/1990 | Nelson | 414/537 |
| 4,909,700 | A * | 3/1990 | Fontecchio et al. | 414/549 |
| 5,160,236 | A | 11/1992 | Redding et al. | 414/537 |
| 5,380,144 | A | 1/1995 | Smith et al. | 414/537 |
| 5,391,041 | A * | 2/1995 | Stanbury et al. | 414/537 |
| 5,393,192 | A | 2/1995 | Hall et al. | 414/537 |
| 5,618,151 | A | 4/1997 | Rosenkranz | 414/495 |
| 5,676,515 | A | 10/1997 | Haustein | 414/537 |
| D389,438 | S | 1/1998 | Guichard et al. | D12/98 |
| D391,900 | S | 3/1998 | Skoog | D12/91 |
| 5,832,555 | A | 11/1998 | Saucier et al. | 14/71.1 |
| 6,010,298 | A | 1/2000 | Cohn et al. | 414/537 |
| 6,039,528 | A * | 3/2000 | Cohn | 414/546 |
| 6,179,545 | B1 * | 1/2001 | Petersen et al. | 414/537 |
| 6,186,733 | B1 * | 2/2001 | Lewis et al. | 414/537 |
| 6,190,112 | B1 * | 2/2001 | Danilovic | 414/541 |
| 6,203,265 | B1 * | 3/2001 | Cohn et al. | 414/537 |
| 6,264,416 | B1 * | 7/2001 | Eaton, Jr. | 414/537 |
| 6,305,897 | B1 * | 10/2001 | Budd et al. | 414/540 |
| 6,328,369 | B1 | 12/2001 | Nagai | 296/95.1 |
| 6,343,908 | B1 * | 2/2002 | Oudsten et al. | 414/537 |
| D454,813 | S | 3/2002 | Boniface et al. | D12/91 |
| 6,390,537 | B1 | 5/2002 | DiGonis | 296/185 |
| 6,470,523 | B1 * | 10/2002 | Sardonico | 14/71.1 |
| 6,484,344 | B1 * | 11/2002 | Cooper | 14/71.1 |
| D466,444 | S | 12/2002 | Meadows | D12/91 |
| 6,578,657 | B2 | 6/2003 | Baxter, Jr. | 180/376 |
| 6,598,253 | B1 * | 7/2003 | Allen et al. | 14/71.1 |
| 6,729,829 | B2 | 5/2004 | Zimmer | 414/522 |
| D497,572 | S | 10/2004 | Widmann et al. | D12/91 |
| 6,860,701 | B2 | 3/2005 | Kiser | 414/537 |
| D507,766 | S | 7/2005 | McMahan et al. | D12/91 |
| 6,951,359 | B2 | 10/2005 | Swift | 296/64 |
| D514,983 | S | 2/2006 | Renkert et al. | D12/91 |
| 7,035,819 | B1 | 4/2006 | Gianakouros et al. | 705/37 |
| D521,901 | S | 5/2006 | Dean | D12/91 |
| D534,097 | S | 12/2006 | Renkert et al. | D12/91 |
| D535,585 | S | 1/2007 | Moushegian et al. | D12/91 |
| 7,228,582 | B1 * | 6/2007 | Jones et al. | 14/71.1 |
| 2001/0038787 | A1 * | 11/2001 | Beck et al. | 414/537 |
| 2004/0146385 | A1 * | 7/2004 | Edwards et al. | 414/537 |
| 2005/0179269 | A1 * | 8/2005 | Weiland | 293/149 |
| 2006/0245883 | A1 * | 11/2006 | Fontaine et al. | 414/537 |

OTHER PUBLICATIONS

Feb. 10, 2009 Office Action for U.S. Appl. No. 11/521,587.
Jul. 1, 2009 Amendment for U.S. Appl. No. 11/521,587.

* cited by examiner

AUTOMOTIVE VEHICLE HAVING A POWER-ACTUATED RAMP

CROSS-REFERENCE TO RELATED APPLICATION(S)

The present application is a continuation-in-part of U.S. Ser. No. 11/521,587, filed Sep. 15, 2006 now abandoned, entitled "Vehicle With Low, Flat Floor And Ramp For Persons With Disabilities And For Other Uses," which claims the benefit of U.S. Provisional Patent Application No. 60/734,284, filed Nov. 8, 2005, the disclosures of which are hereby incorporated by reference in their entirety into the present disclosure.

BACKGROUND OF THE INVENTION

1. Field of the Invention

The present invention is directed toward an automotive vehicle having a power-actuated ramp.

2. Description of the Related Art

Automotive vehicles such as sedans, sport-utility vehicles (SUVs), mini-vans and "cross-over" vehicles are not designed to accommodate passengers with disabilities. More specifically, these types of automotive vehicles are not compliant with the regulations provided by the Americans with Disabilities Act (ADA) 42 U.S.C. 12101 et seq. By way of example, persons with disabilities or persons requiring the use of a mobility aid (e.g. wheelchairs) cannot board/alight traditionally designed vehicles with relative ease due to spatial constraints of the vehicle's entry opening, seating configurations and/or contoured interior floor.

Retrofitting traditionally designed automotive vehicles to accommodate persons with disabilities and/or mobility aids increases the vehicle purchase price. The increased price can prevent such persons from purchasing an automotive vehicle that is acceptable for their individual use, thereby forcing such persons to rely on commercial and/or municipal paratransit services. Additionally, the increased price of a retrofit automotive vehicle reduces the number of acceptable vehicles that municipalities and/or commercial transportation service companies can make available for use by the general public.

Furthermore, retrofitting a traditionally designed automotive vehicle can result in an unsightly vehicle appearance and also impede certain functional aspects of the vehicle. By way of example, retrofitting traditionally designed automotive vehicles can include providing a flat interior floor by installing a custom subfloor or increasing the interior height by installing an aftermarket roof. These retrofit techniques change the OEMs' interior and exterior vehicle aesthetics in a manner that is often considered unattractive. Further by way of example, traditionally designed automotive vehicles are often retrofitted with a "draw-bridge" ramp or a vertical lift mechanism to assist boarding/alighting by persons requiring a mobility aid. However, these boarding/alighting assistance devices often block an entry point to conventional ingress/egress. Blocking an ingress/egress entry point is a practical impossibility for municipal and/or commercial transit services that must provide transportation for disabled and non-disabled persons with the same vehicle.

Thus, there is a need in the art for an automotive vehicle that is designed with ADA regulations in mind. Additionally, there is a need in the art for an automotive vehicle that provides vehicle boarding/alighting to persons with disabilities and/or mobility aids as well as conventional ingress/egress to persons without disabilities. Specifically, there is a need in the art for an automotive vehicle having a power-actuated ramp.

SUMMARY OF THE INVENTION

The present invention overcomes many limitations and disadvantages in the related art in an automotive vehicle having a power-actuated ramp. The automotive vehicle includes a vehicle body having a roof, front portion, rear portion, opposed side portions, and a floor that cooperate to define a passenger area, which defines a flat area of the floor adapted to receive a mobility device. At least one door provides boarding and alighting relative to the passenger area. A ramp cartridge is operatively supported by and received within a recessed section of the floor and includes a frame assembly having a main deck and cooperating with and being substantially coplanar with the flat area to provide a substantial flatness of the floor, a ramp assembly having a ramp that is adapted to be retained in a stored position below the main deck, and a drive assembly adapted to actuate the ramp between the stored position and a first ramp position and between the stored position and a second ramp position.

Thus, one advantage of the present invention is that it provides an automotive vehicle having a power-actuated ramp that actuates to a first ramp position and a second ramp position.

Another advantage of the present invention is that it provides a power-actuated ramp having a stored position below the main deck of the ramp cartridge.

Yet another advantage of the present invention is that is provides a power-actuated ramp that is contained within a ramp cartridge.

Still another advantage of the present invention is that it provides a drive assembly that utilized power to actuate the ramp between the stored position, first ramp position and second ramp position.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
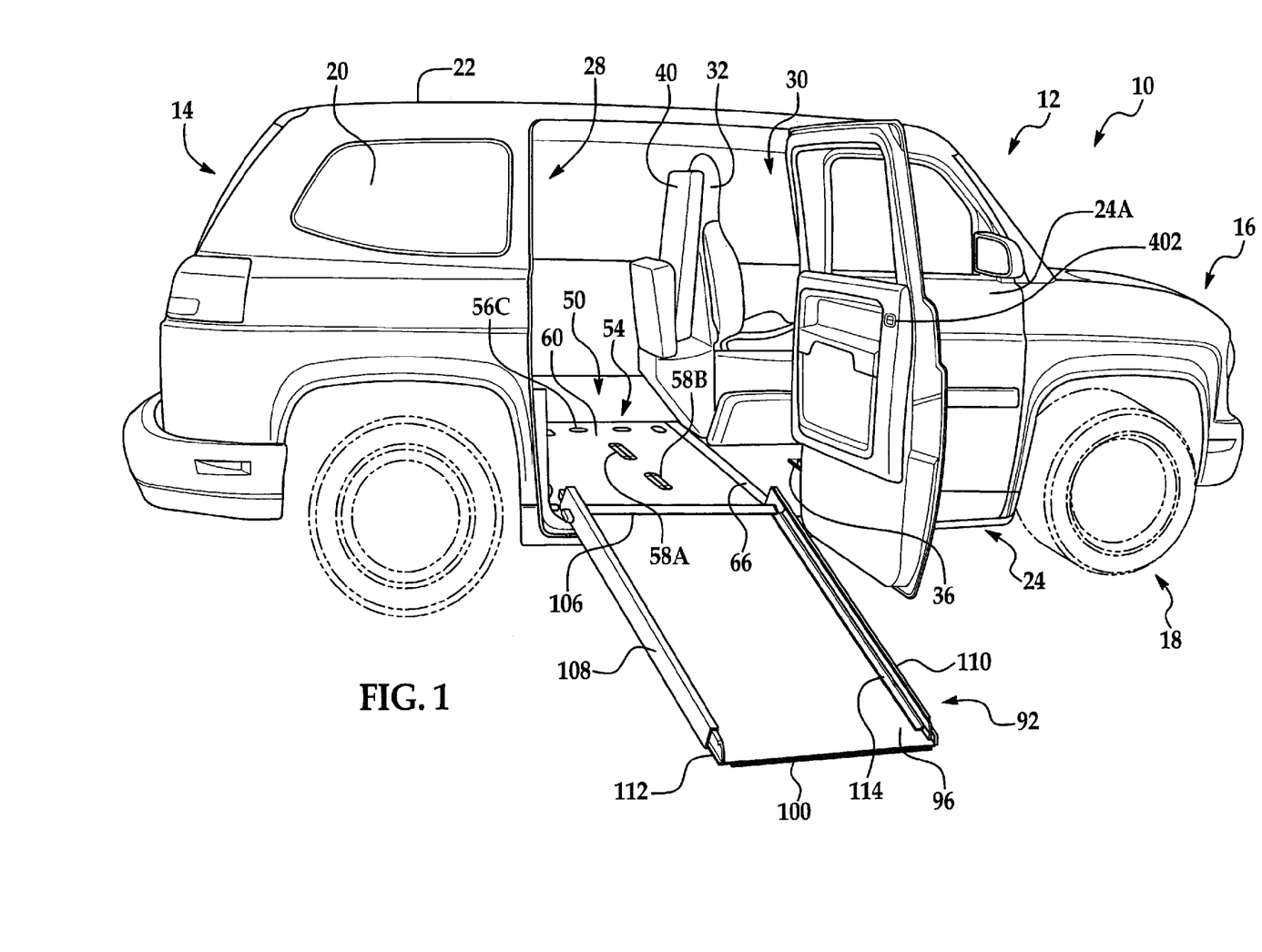
FIG. 1 is a side perspective view of the present invention having the power-actuated ramp deployed in the first ramp position.
Figure 2:
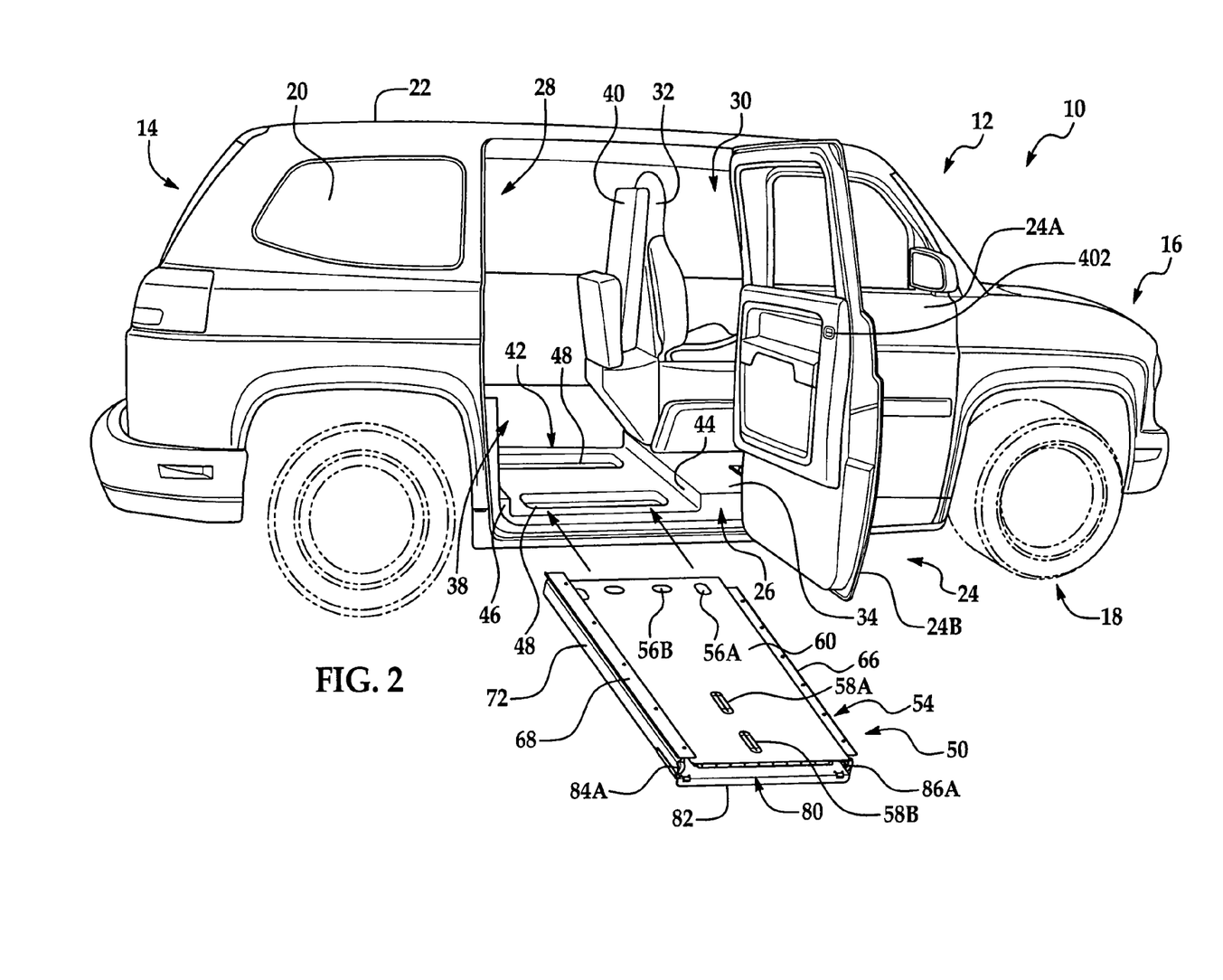
FIG. 2 is a side perspective view of the present invention where the ramp is separated from the automotive vehicle.

Referring now to the figures where like numerals are used to designate like structure throughout the drawings, an automotive vehicle of the present invention is generally indicated at 10. As shown in FIGS. 1 and 2, the automotive vehicle 10 includes a vehicle body, generally indicated at 12. The vehicle body 12 includes a rear portion generally indicated at 14, a front portion generally indicated at 16 and opposed side portions generally indicted at 18. The opposed side portions 18 having rear windows 20. The vehicle body 12 further includes a roof 22 that is disposed between the front portion 16, rear portion 14 and opposed side portions 18. The automotive vehicle 10 further includes at least one door, generally indicated at 24. As shown in FIGS. 1 and 2, the vehicle body 12 includes a front passenger side door 24A and a rear passenger side door 24B. Although not shown, it should be appreciated that the vehicle body 12 includes a front driver side door and a rear driver side door. Furthermore, those having ordinary skill in the art will appreciate that the present invention may be employed for use in connection with a vehicle body design that will be driven by a particular vehicle application. By way of example, the present invention may be employed within an automotive vehicle designed for courier/delivery service where the vehicle body 12 does not include rear windows 20. Although not show in FIGS. 1 and 2, those having ordinary skill in the art will appreciate that the automotive vehicle 10 of the present invention includes structure that is commonly included within an automotive vehicle 10. Products that are known to be employed within an automotive vehicle 10 include a chassis, motor and powertrain, bumpers, headlights, taillights, steering systems, braking systems, and audio/visual/information systems.

The vehicle body 12 further includes a floor generally indicated at 26. The roof 22, floor 26, opposed side portions 18, front portion 16 and rear portion 14 cooperate to define a passenger area generally indicated at 28. The passenger area 28 includes a front seating area generally indicated at 30. The front seating area 30 includes a driver's seat 32 and a flat area 34 defined on the floor 26 adjacent to the driver's seat 32. The flat area 34 is adapted to receive a mobility device. To this end, the flat area 34 includes a tie-down member 36 that is adapted to lock a mobility device to the flat area 34 so as to prevent undesired movement during operation of the automotive vehicle. It should be appreciated that a mobility device may include any device that is used to assist an individual with paralysis, degenerative disease, disability, geriatric ailments in walking. By way of example, a mobility device includes a wheel chair, walker, electric scooter, electric tricycle or other device commonly used by such persons.

The passenger area 28 further includes a rear area generally indicated at 38. The rear area 38 includes a passenger seat 40 and a recessed section generally indicated at 42. The recessed section 42 is generally defined by a pair of shoulders 44 and 46 disposed on opposite sides of said recessed section 42. The recessed section 42 is adapted to receive a ramp cartridge as will be described in greater detail. To this end, the recessed section 42 includes at least one depression 48 to receive a portion of the drive assembly of a ramp cartridge as will be described in greater detail below. As shown in FIG. 2, the recessed section 42 is disposed adjacent to the rear passenger side door 24B. However, those having ordinary skill in the art will appreciate that the recessed section 42 may be located on other areas of the vehicle floor 26. By way of example the recessed section 42 may be included in the front passenger seating area 30 adjacent to the front passenger door 24A.

Although the passenger area 28 has been described above as having a general use, it should be appreciated that the passenger area 28 of the present invention may include additional and/or alternative structure that is designed for a specific application without departing from the scope of the invention. By way of example, the automotive vehicle 10 may be employed for use as a taxi, wherein the passenger area may include a partition between the driver's area and the rest of the passenger area. Further by way of example, the automotive vehicle 10 may be employed for use as an emergency medical team vehicle, ambulance or other "first response" vehicle, wherein the passenger area may include storage compartments for medical or other first response-type supplies.

The present invention further includes a ramp cartridge generally indicated at 50. The ramp cartridge 50 is operatively supported by the vehicle floor 26 and adapted to be removably secured to the vehicle 10. More specifically, the ramp cartridge 26 is received within the recess section 42 of the rear passenger area 28. The ramp cartridge 50 is a self-contained unit that is removable from the vehicle 10 to provide "plug-and-play" capability. Such capability is desired for replacing or servicing a ramp cartridge 50, especially when the vehicle 10 is employed for use in connection with municipal/commercial fleet services.

The ramp cartridge 50 includes a frame assembly generally indicated at 52. The frame assembly 52 includes a main deck, generally indicated at 54, that is substantially coplanar with the flat area 34. More specifically, the main deck 54 cooperates with the flat area 34 to provide a substantially flat vehicle floor 26. The flat vehicle floor 26 provided by the present invention enables mobility devices to be maneuvered across the floor 26 without incurring the problems typically associated with manipulating a mobility device within a conventionally designed automotive vehicle. The automotive vehicle 10 of the present invention is adapted to be capable of maneuvering at least two wheelchairs on the vehicle floor 26.

Figure 6:
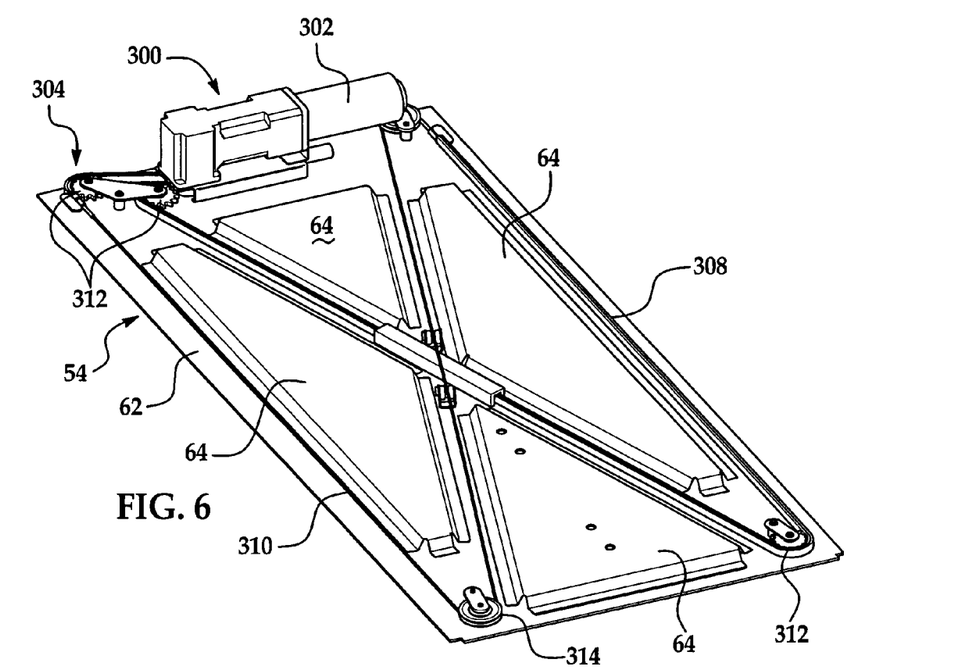
FIG. 6 is a bottom view of the drive assembly and main deck of the present invention.

The main deck 54 further includes at least one service door 56 to access a portion of said ramp cartridge 50. As shown throughout the figures, the main deck 54 includes four service doors 56A, 56B, 56C and 56D. The main deck 54 further includes at least one anchor member 58 to secure a mobility device to the ramp cartridge 50. As shown throughout the figures the main deck 54 includes two anchor members 58A and 58B. Additionally, the main deck 54 includes a top surface 60 having slip-resistant coating (not shown) that is ADA complaint (ADA T802.2) and includes a minimum static coefficient of friction of 0.5 (ASTM Standard D2047 and CSA D409-02 9.2.1). Referring specifically to FIG. 6, the main deck 54 includes a bottom surface 62 that is adapted to retain a portion of the drive assembly as will be described in greater detail below. The bottom surface 62 includes at least one reinforcing member 64 that is adapted to improve the structural integrity of the main deck 54. As illustrated in FIG. 6, the bottom surface 62 includes four reinforcing members 64.

Figure 5:
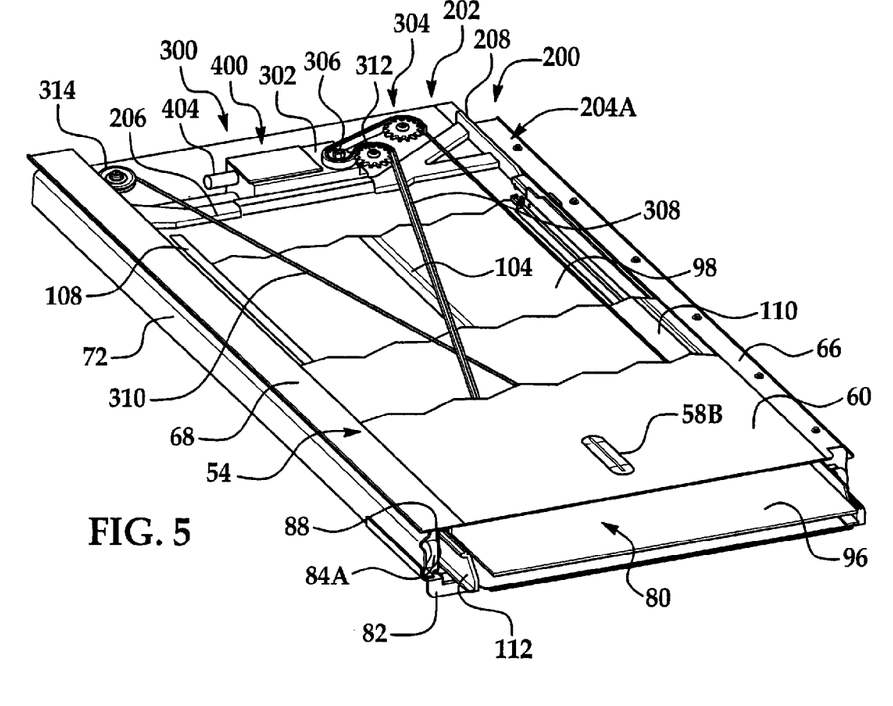
FIG. 5 is a cut-away view of the ramp cartridge of the present invention.
Figure 7:
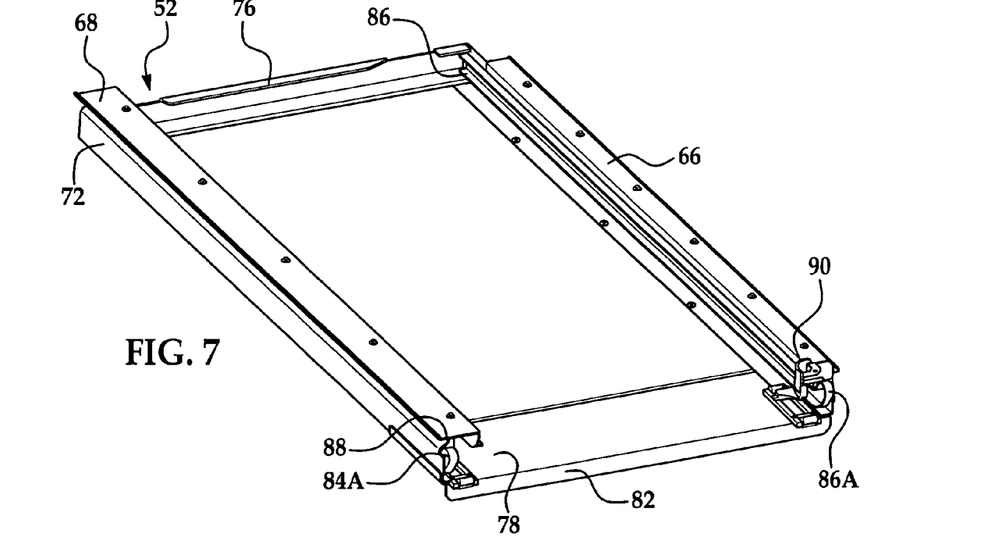
FIG. 7 is a perspective view of the frame assembly of the present invention.

The frame assembly 52 further includes flanges 66 and 68 that are adapted to extend over the shoulders 44 and 46, respectively, adjacent to the recessed section 42 within the vehicle floor 26. The flanges 66 and 68 are adapted to eliminate voids, openings, and surface discontinuities that may otherwise occur between the ramp cartridge 50 and the vehicle floor 26. To this end, the flanges 66 and 68 facilitate compliance with the ADA regulations and/or proposed ADA regulations. As shown throughout the figures, the frame assembly 52 includes a forward flange 66 that extends along the side of the main deck 54 adjacent to the flat area 34 on the vehicle floor 26 and a rearward flange 68 that extends along the opposite side of the main deck 54 relative to forward flange 66. As best shown in FIGS. 5 and 7, the rearward flange 68 is elevated relative to the main deck 54 to correspond with an elevated portion of the vehicle floor 26 (FIG. 2).

Additionally, the rearward flange 68 is adapted to protect other components of the ramp cartridge 50 to be described in greater detail below. Those having ordinary skill in the art will appreciate that the size, location and relationship to the main deck 54 may vary depending on contours of the vehicle structure adjacent to the location adapted to receive the ramp cartridge 50. It should be further appreciated by those having ordinary skill in the art that the flanges 66 and 68 may provide a substrate through which the ramp cartridge 50 may be removably attached to the vehicle 10. To this end, the ramp cartridge 50 may be attached to the vehicle floor 26 using fasteners such as screws or other suitable method for removably attaching the ramp cartridge 50 to the vehicle 10.

Referring specifically to FIG. 7, the frame assembly 52 further includes a frame, generally indicated at 70. The frame 70 includes side members 72 and 74 that depend from the flanges 66 and 68, respectively, and a cross member 76 that extends between the side members 72 and 74. The frame 70 further includes a base member 78 extending between the side members 72 and 74 substantially parallel to the cross member 76. The base member 78 and the main deck 54 cooperate to define an opening, generally indicated at 80, within the ramp cartridge 50 through which the ramp (to be described) is actuated. The base member 78 includes a lip 82 depending therefrom that is adapted to contact a portion of the recess section 42 of the vehicle floor 26 and provide a positive stop for the ramp cartridge 50 during installation. It should be appreciated that the frame 70 corresponds to the outline of the main deck 54 and cooperates with the reinforcing member 64 to support the main deck 54. To this end, those having ordinary skill in the art will appreciate that size, location and configuration of the side members 72 and 74, cross member 76 and base member 78 may vary without departing from the scope of the invention.

Figure 8:
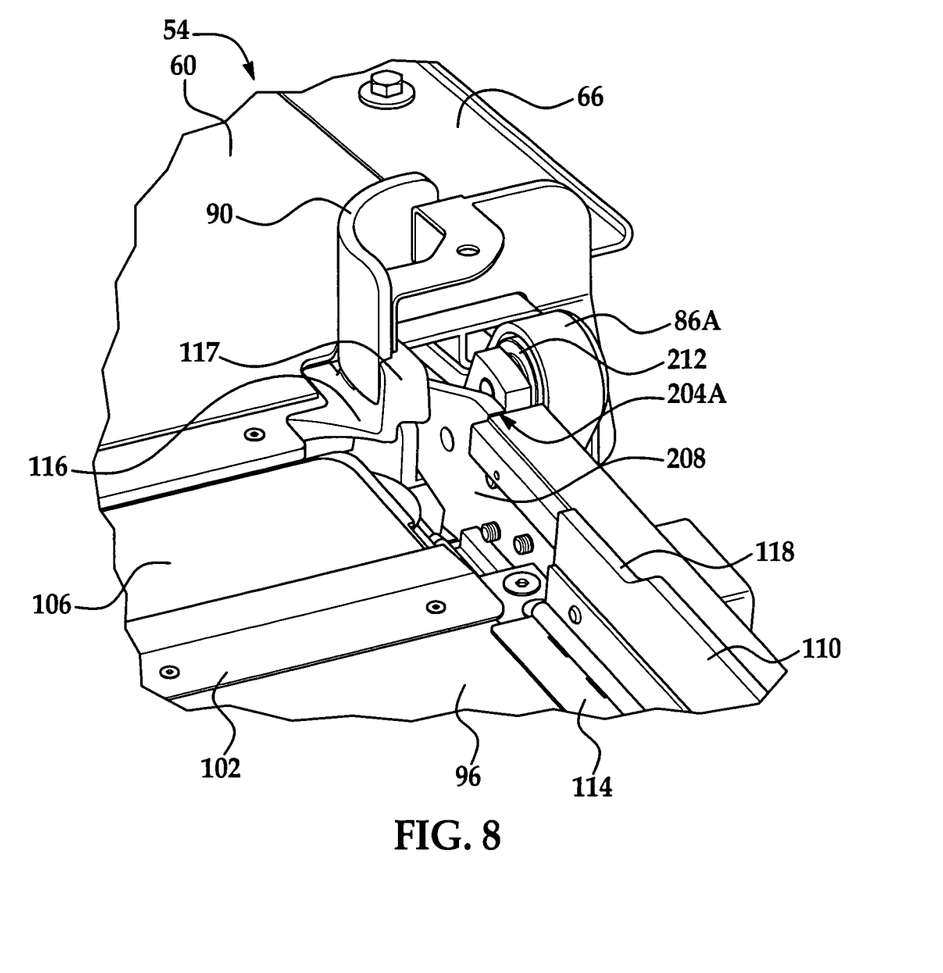
FIG. 8 is an enlarged fragmentary view of a portion of the ramp cartridge of the present invention.

As best shown in FIGS. 7 and 8, the frame 70 further includes primary tracks 84 and 86 that are disposed on the side members 72 and 74, respectively, and aligned with respect to each other. The primary tracks 84 and 86 are adapted to receive a portion of the trolley assembly as will be described in greater detail below. Each of the primary tracks 84 and 86 includes an upwardly extending terminal end 84A and 86A that extends outward from the corresponding base member 78. In order to prevent damage to one of the upwardly extending terminal ends 84A the rearward flange 68 includes a hood portion 88 that is extends axially outward relative to the side member 72 (FIG. 7). Additionally, the frame assembly 52 includes a guard 90 adjacent to the forward flange 66 to protect the other upwardly extending terminal end 86A (FIG. 8).

The ramp cartridge 50 further includes a ramp assembly generally indicated at 92. The ramp assembly 92 is adapted to facilitate boarding and alighting relative to the passenger area 28 of the vehicle 10. It should be appreciated that the ramp assembly 92 meets or exceeds the ADA regulations and/or ADA proposed regulations for load and safety factor (ADA T303.2) and is in generally compliance with ADA T303. The ramp assembly 92 includes a ramp 94 that is adapted to be retained in a stored position below the main deck 54. The ramp 94 is adapted to be actuated from the stored position to a first ramp position (FIG. 3B) having a slope no steeper than 1:4. In the preferred embodiment, the first ramp position will have a slope not steeper than 1:6 to provide compliance with ADA regulations and/or proposed ADA regulations for boarding and alighting from the roadway or areas without station platforms (ADA T303.8.1). The ramp 94 is also adapted to be actuated from the stored position to a second ramp position (FIG. 3A) having a slope no steeper than 1:6. However, in the preferred embodiment, the second ramp position will have a slope not steeper than 1:8 to provide compliance with ADA regulations and/or proposed ADA regulations for boarding and alighting from a roadside curb or station platforms (ADA T303.8.2). It should be appreciated that the ramp 94 includes a slip-resistant coating (not shown) that is ADA complaint (ADA T802.2) and includes a minimum static coefficient of friction of 0.5 (ASTM Standard D2047 and CSA D409-02 9.2.1).

Figures 3A, 3B:
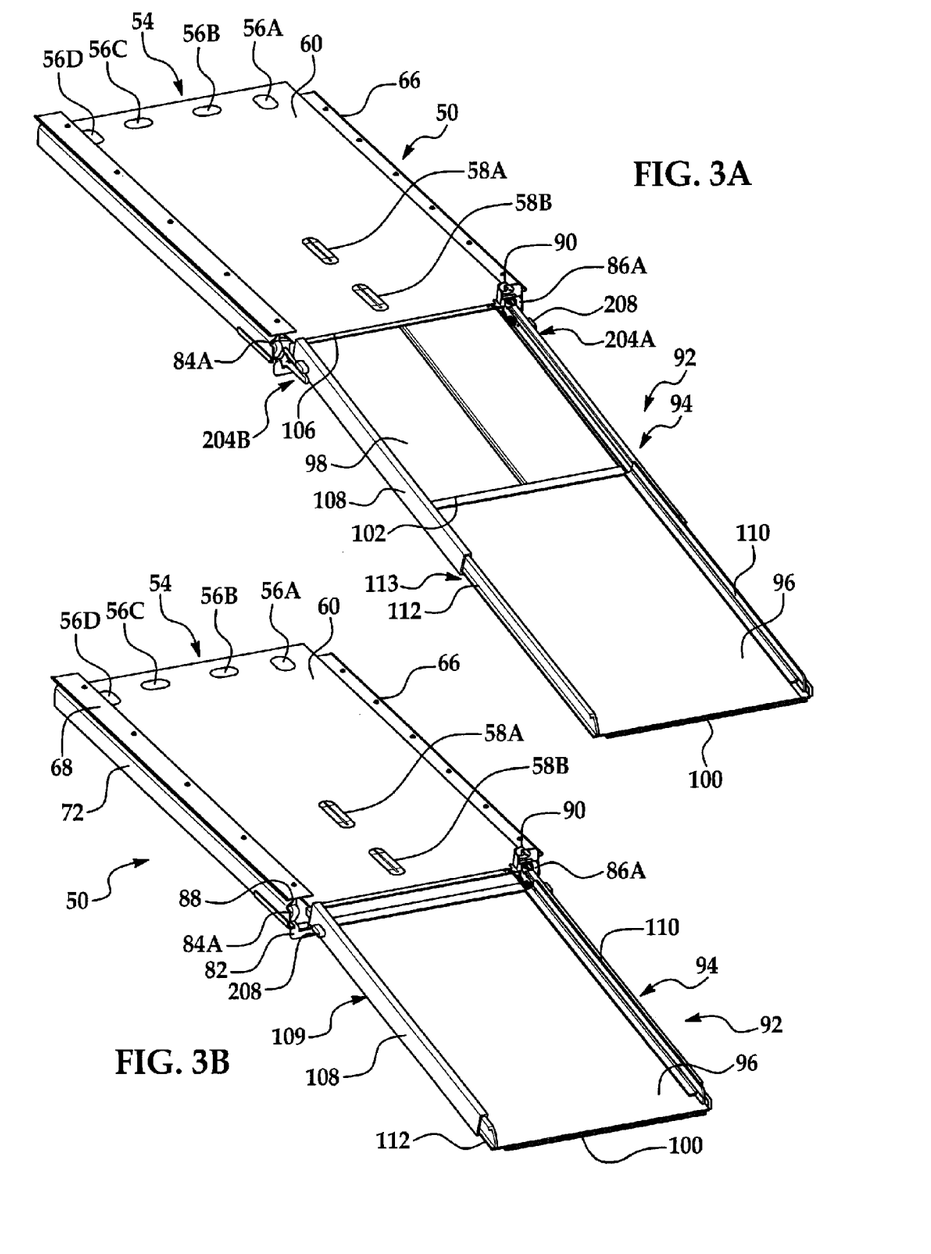
FIG. 3A is a perspective view of the ramp cartridge having the ramp deployed in the second ramp position.
FIG. 3B is a perspective view of the ramp cartridge having the ramp deployed in the first ramp position.
Figure 4:
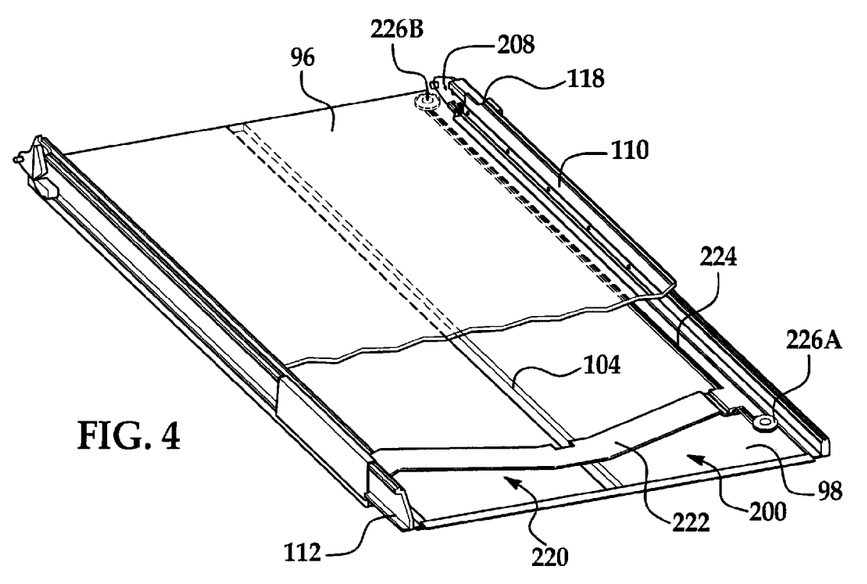
FIG. 4 is a cut-away view of the ramp assembly of the present invention.

The ramp 94 includes a leading segment 96 and at least one trailing segment 98. As best shown in FIGS. 3A and 3B, the ramp 94 includes a leading segment 96 and one trailing segment 98. Those having ordinary skill in the art will appreciate that ramp 94 may include more than one trailing segment 98. In the stored position and in the first ramp position, the leading segment 96 and the trailing segment 98 are oriented in a stacked configuration to provide a compact ramp (FIGS. 3B and 4). In the second ramp position, the leading segment 96 and the trailing segment 98 are oriented in a substantially co-axial configuration with respect to each other (FIG. 3A). It should further be appreciated by those having ordinary skill in the art that the present invention may include ramp segments in other configurations such as a nesting configuration or staggered configuration without departing from the scope of the invention.

The leading segment 96 includes a facing edge 100 that is adapted to contact the boarding and alighting area (not shown) and a sweep edge 102 that is adapted to contact the trailing segment 98 when the ramp 64 is actuated in the second ramp position. The trailing segment 98 includes groove 104 adapted to receive a portion of the trolley assembly (to be described) and threshold edge 106 that is operatively disposed adjacent to the main deck 54 when the ramp 94 is actuated in either the first ramp position or the second ramp position. In the first ramp position, the sweep edge 102 and the threshold edge 106 abut each other adjacent to the main deck 54 (FIG. 3B). The threshold edge 106, sweep edge 102 and facing edge 100 are adapted to facilitate a smooth transition between a boarding and alighting area and the passenger area 28 of the vehicle 10. More specifically, the threshold edge 106, sweep edge 102 and facing edge 100 are provided for compliance with ADA regulation and/or proposed ADA regulations.

The ramp assembly 92 further includes a main fence 108 and a spring fence 110 operatively attached to the ramp 94. The main fence 108 and spring fence 110 are adapted to be disposed adjacent to the primary tracks 84 and 86, respectively, when the ramp 94 is located in the stored position (FIG. 5). The main fence 108 and the spring fence 110 are further adapted to deploy in a telescoping manner relative to the primary tracks 84 and 86, respectively, when the ramp 94 is actuated from the stored position to the first ramp position. In the first ramp position, the main fence 108 defines a short edge barrier 109 during boarding and alighting (FIGS. 1 and 3B). The ramp assembly 92 further includes at least one tertiary fence 112 (FIG. 3A). The tertiary fence 112 is adapted to be received within the main fence 108 when the ramp 94 is located in the stored position and the first ramp position. In the second ramp position, the tertiary fence 112 is adapted to extend axially outward from the main fence 108 to cooperate with the main fence 108 to define a long edge barrier 113 during boarding and alighting at the second ramp position (FIG. 3A). The main fence 108, tertiary fence 112 and spring fence 110 include dimensions and structure that is compliant with ADA regulation and/or ADA proposed regulations (ADA T030.7). More specifically, the main fence 108 and tertiary fence 112 are rigid components that are fixed to the ramp assembly 92 in a substantially perpendicular configuration relative to the ramp 94.

Referring specifically to FIG. 8, the spring fence 110 is pivotally attached to the ramp 94 by a spring hinge 114 so as to be oriented substantially perpendicular to the ramp 94 when the ramp 94 is located in the first ramp position or the second ramp position. However, the spring fence 110 is adapted to be oriented substantially parallel to the ramp 94 when the ramp assembly 92 is located in the stored position (FIG. 5). To provide for the pivoting movement of the spring fence 110, the frame assembly 52 further includes a helix 116 and the spring fence includes a notched terminal end 118. The helix 116 is operatively attached to the frame assembly 52 adjacent to the guard 90 and includes a contact surface 117. As the ramp 94 is actuated toward the stored position, the notched terminal end 118 of the spring fence 110 contacts the contact surface 117 which manipulates the spring fence 110 from the substantially perpendicular orientation relative to the ramp 94 (FIGS. 1, 3A, 3B and 8) to a substantially parallel orientation relative to the ramp 94 (FIG. 5).

Those having ordinary skill in the art will appreciate that while the present invention has been described has having a main fence 108, tertiary fence 112 and a spring fence 110, the present invention may include a single style of fence throughout the ramp 94 to provide edge barriers that are compliant with ADA regulations and/or ADA proposed regulations. By way of example, the present invention may include a series of spring fences, ridged fences or fences that "pop-up" from a location with or adjacent to the ramp 94.

Referring now to FIGS. 4, 5 and 8, the ramp cartridge 50 further includes a trolley assembly generally indicated at 200. The trolley assembly 200 is adapted to facilitate actuation of the ramp assembly 92 between the stored position, first ramp position and the second ramp position. More specifically, the trolley assembly 200 interconnects the ramp assembly 92 to the drive assembly as will be described in greater detail below. The trolley assembly 200 includes a sled, generally indicated at 202. The sled 202 includes a roller sub-assembly, generally indicated at 204. As shown in FIG. 3A, the trolley assembly 200 includes two roller sub-assemblies 204A and 204B defined within each of the primary tracks 84 and 86, respectively. The sled 202 further includes a cart 206 that is disposed between the roller sub-assemblies 204A and 204B (FIG. 5). Each of the roller sub-assemblies 204A and 204B includes a body 208 that is attached to the ramp assembly 92 and at least one roller 212 that is operatively disposed within a primary track 84 or 86. The cart 206 is operatively engaged to the drive assembly (to be described) and adapted to move the roller sub-assemblies 204A and 204B within the primary tracks 84 and 86, respectively, to actuate the ramp 94 between the stored position and the first ramp position.

The trolley assembly 200 further includes a carrier, generally indicated at 220. The carrier 220 is operatively connected to the drive assembly as will be described in greater detail below. The carrier 220 includes a wing 222 that is disposed between the leading segment 96 and the trailing segment 98. The wing 222 cooperates with the groove 104 defined within the trailing segment 98 to facilitate movement of the ramp 94 between the stored position and the second ramp position or vice versa. As shown in FIG. 4, the carrier 220 further includes a series of cables 224 and pulleys 226A and 226B that interconnect the carrier 220 with the drive assembly (to be described) to initiate movement of the carrier 220 when the ramp 94 is actuated between the stored position and the second ramp position.

When the trolley assembly 200 actuates the ramp 94 from the stored position, the sled 202 directs the roller sub-assemblies 204A and 204B within the primary tracks 84 and 86, respectively, toward the upwardly extending terminal ends 84A and 86A. More specifically, where the ramp 94 is to be actuated in the first ramp position, the trolley assembly 200 pushes the leading segment 96 and the trailing segment 98 in a stacked configuration. As the roller sub-assemblies 204A and 204B engage the upwardly extending terminal ends 84A and 86A of the primary tracks 84 and 86, respectively, the ramp 94 is pivoted upward so as to direct the facing edge 100 toward the boarding and alighting area and to direct the threshold edge 106 and sweep edge 102 toward the main deck 54 (FIGS. 3B and 8). When the ramp 94 is to be actuated in the second ramp position, the carrier 220 pushes the leading segment 96 into a substantially co-axial configuration relative to the trailing segment 98. Additionally, the sled 202 pushes the trailing segment 98 such that the roller sub-assemblies 204A and 204B proceed toward the upwardly extending terminal ends 84A and 86A, respectively. Accordingly, as the roller sub-assemblies 204A and 204B engage the upwardly extending terminal ends 84A and 86A of the primary tracks 84 and 86, the facing edge 100 is directed toward the boarding and alighting area and the threshold edge 106 of the trailing segment 98 is directed toward the main deck 54 to position the ramp 94 in the second ramp position.

Referring specifically to FIGS. 5 and 6, the ramp cartridge 50 includes a drive assembly, generally indicated at 300. The drive assembly 300 is adapted to actuate the ramp 94 to and from the stored position, the first ramp position and the second ramp position. The drive assembly 300 includes a motor 302 mounted to a portion of the frame assembly 52 and a drivetrain, generally indicated at 304. The drivetrain 304 is adapted to operatively interconnect the motor 302 to the ramp assembly 94. More specifically, the drivetrain 304 is connected to the trolley assembly 200 and directs the trolley assembly 200 to engage the ramp assembly 92, as previously described.

The drivetrain 304 includes an override gear 306 that is adapted to disengage the motor 302 from the drivetrain 304 to facilitate manual actuation of the ramp 94 to and from the stored position, first ramp position and second ramp position. The drivetrain 304 further includes a drive belt 308 that is coupled to a cable 310 that directs the trolley assembly 200 to move the ramp 94. The drivetrain 304 further includes a plurality of gears 312 to engage the drive belt 308 and a plurality of drive pulleys 314 to engage the cable 310 to provide satisfactory tension and consistent movement of the trolley assembly 200 throughout the course of actuating the ramp 94. Those having ordinary skill in the art will appreciate that the drive assembly 300 and trolley assembly 200 may include different structure without departing from the scope of the present invention. By way of example, the drive assembly 300 may include a worm-drive system and/or eliminate the trolley assembly entirely to provide direct connection between the drive assembly 300 and the ramp assembly 92.

It should also be appreciated that the trolley assembly 200 and the drive assembly 300 cooperate to actuate the ramp 94 to and from the stored position, first position and second position in manner that is compliant with ADA regulations and/or ADA proposed regulations. More specifically, the trolley assembly 200 and the drive assembly 300 cooperate to provide a ramp deployment time that deploys or retracts no greater than 120 seconds, where the preferred embodiment deploys no greater than 60 seconds. Additionally, the trolley assembly 200 and the drive assembly 300 cooperate to provide a ramp deployment speed that is compliant with ADA regulations and/or proposed ADA regulations (i.e. ADA T302.5.8.1). Furthermore, the trolley assembly 200 and the drive assembly 300 cooperate to actuate the ramp 94 in a manner that does not exceed 80 dBa.

The ramp cartridge 50 further includes a control module, generally indicated at 400. The control module is adapted to control the power actuation of the ramp 94 in response to operator input. Accordingly, the control module 400 includes a switch 402 (FIGS. 1 and 2) for use by the operator to engage the power actuation of the ramp 94. As shown in FIGS. 1 and 2, the switch 402 is fixed within a portion of the rear passenger door 24B. However, those having ordinary skill in the art will appreciate that the switch 402 may be located at any position in the vehicle 10. It should also be appreciated that the switch 402 may be wireless and integrated within a vehicle key fob or other remote control device.

The control module 400 further includes a sensor unit 404. The sensor unit 404 is adapted to stop actuation of the ramp 94 in response to a predetermined condition. More specifically, the control module 400 is adapted to receive a signal from the sensor unit 404 corresponding to an excessive load on the drive assembly 300 and, in response to the signal, override the operator's input and stop actuation of the ramp 94. By way of example, excessive load may be the result of the facing edge 100 engaging a foreign object or a foreign object becoming lodged within a portion of the ramp assembly 92. Those having ordinary skill in the art will appreciate that the control module 400 may include a short retreat function in addition to or as an alternative to the stop feature. By way of example, in response to a signal from the sensor unit 404, the control module 400 will override the operator's input via the switch 402 and stop actuation of the ramp but also direct the drive assembly 300 to retreat the ramp a predetermined distance (e.g. two inches). It should also be appreciated that the sensor unit 404 may include optical sensor that directs the control module 400 to override the operator's input prior to an actual load being incurred by the drive assembly 300. By way of example, the sensor unit 404 may include an infrared beam that detects foreign objects within a proximate distance of the leading edge 100 (e.g. six inches) and signals the control module 400 to stop actuation of the ramp 94 and/or retreat the ramp 94 a predetermined distance. Additionally, the control module 400 may further include additional safety or warning features. By way of example, the control module 400 may be operatively connected to an audible and/or visual alert system that activates when the ramp 94 is being actuated.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An automotive vehicle comprising:
   a vehicle body having a roof, front portion, rear portion, opposed side portions, and a floor that cooperate to define a passenger area, which defines a flat area of said floor adapted to receive a mobility device;
   at least one door to provide boarding and alighting relative to said passenger area;
   a ramp cartridge operatively supported by and received within a recessed section of said floor and including a cam surface and a frame assembly having a main deck and cooperating with and being substantially coplanar with said flat area to provide a substantial flatness of said floor, a ramp assembly having a ramp that is adapted to be retained in a stored position below said main deck, and a drive assembly adapted to actuate said ramp between said stored position and a first ramp position and between said stored position and a second ramp position; and
   a main fence and a spring fence that are adapted to be extended from said frame assembly as said ramp extends from said stored position to said first ramp position and retracted into said frame assembly as said ramp moves from said first ramp position to said stored position, said spring fence having a first end and being pivotally attached to said ramp so as to be oriented substantially perpendicular to said ramp when said ramp is actuated from said stored position to said first ramp position, said first end of said spring fence disposed so as to contact and move along said cam surface as said ramp moves from said first ramp position to said stored position thereby causing said spring fence to pivot to a position substantially parallel to said ramp when said ramp is located in said stored position.

2. The automotive vehicle as set forth in claim 1 wherein said drive assembly includes a motor mounted to said frame assembly, a drivetrain operatively interconnecting said motor to said ramp assembly and a manual override member that is adapted to disengage said motor from said drivetrain to facilitate manual actuation of said ramp between said stored position and said first ramp position and between said stored position and said second ramp position.

3. The automotive vehicle as set forth in claim 1 wherein said frame assembly is adapted to provide removable attachment of said ramp cartridge to said automotive vehicle, said main deck having at least one service door to access a portion of said ramp cartridge and at least one anchor member to secure said mobility device to said ramp cartridge.

4. The automotive vehicle as set forth in claim 1 wherein said frame assembly further includes a frame having primary tracks and said main fence and said spring fence are adapted to be received within said frame assembly adjacent to said primary tracks when said ramp is in said stored position and deploy in a telescoping manner relative to said primary tracks when said ramp is actuated to said first ramp position.

5. The automotive vehicle as set forth in claim 4 wherein said ramp assembly further includes at least one tertiary fence that is adapted to be received within said main fence when said ramp is in said stored position and said first ramp position, said tertiary fence is also adapted to extend axially outward from said main fence when said ramp is actuated to said second ramp position.

6. The automotive vehicle as set forth in claim 1 wherein said ramp includes a leading segment and a trailing segment that are adapted to be actuated in a stacked configuration to define said first ramp position having a slope no steeper than 1:4 a substantially co-axial configuration to define said second ramp position having a slope no steeper than 1:6.

7. The automotive vehicle as set forth in claim 1 wherein said ramp cartridge further includes a control module that controls power actuation of said ramp between said stored position, said first ramp position and said second ramp position in response to operator input, and a sensor unit that is adapted to stop actuation of said ramp between said stored position, said first ramp position and said second ramp position in response to a predetermined condition.

8. The automotive vehicle as set forth in claim 1 wherein said passenger area includes a front seating area having a driver's seat and said flat area defined on said floor and adjacent to said driver's seat to receive said mobility device and a rear area having at least one rear passenger seat and said recessed section adapted to receive said ramp cartridge such that said main deck and said flat area are substantially coplanar and having at least one depression to receive a portion of said drive assembly, said ramp assembly having flanges to facilitate said substantially coplanar relationship and provide a transition between said main deck and adjacent portions of said passenger area.

9. An automotive vehicle comprising:
a vehicle body having a roof, front portion, rear portion, opposed side portions and a floor that cooperate to define a passenger area, which defines a flat area of said floor adapted to receive a mobility device;
at least one door to provide boarding and alighting relative to said passenger area;
a ramp cartridge removably mounted to and received within a recessed section of said floor and including a frame assembly having a main deck and cooperating with and being substantially coplanar with said flat area to provide a substantial flatness of said floor and a ramp assembly having a ramp that is adapted to be retained in a stored position below said main deck and includes a leading segment and at least one trailing segment that cooperate to define a first ramp position and a second ramp position, said at least one trailing segment having a first end adjacent said at least one door when said ramp is in said first ramp position and a second end located exterior to said at least one door when said ramp is in said first ramp position;
said ramp cartridge further includes a drive assembly adapted to actuate said ramp between said stored position, said first ramp position and said second ramp position;
said frame assembly includes a first frame member having an upwardly extending end adjacent said at least one door and a second frame member having an upwardly extending end adjacent said at least one door; and
wherein actuation of said ramp from said stored position to said first ramp position causes said first end of said at least one trailing segment to extend beyond said upwardly extending ends of said first and second frame members and pivot upwardly.

10. The automotive vehicle as set forth in claim 9 wherein said drive assembly includes a motor mounted to said frame assembly, a drivetrain operatively interconnecting said motor and said ramp assembly and a manual override member that is adapted to disengage said motor from said drivetrain to facilitate manual actuation of said ramp between said stored position and said first ramp position and between said stored position and said second ramp position.

11. The automotive vehicle as set forth in claim 9 wherein said ramp assembly further includes a main fence and a spring fence operatively attached to said ramp and adapted to be received within said frame assembly when said ramp is in said stored position and deploy in a telescoping manner relative to said frame assembly when said ramp is actuated to said first ramp position, said main fence is adapted to provide a short edge barrier during boarding and alighting at said first ramp position.

12. The automotive vehicle as set forth in claim 11 wherein said ramp assembly further includes at least one tertiary fence that is adapted to be received within said main fence when said ramp is in said stored position and said first ramp position, said tertiary fence is also adapted to extend axially outward from said main fence when said ramp is actuated to said second ramp position, said tertiary fence cooperating with said main fence to define a long edge barrier during boarding and alighting at said second ramp position.

13. The automotive vehicle as set forth in claim 11 wherein said spring fence is pivotally attached to said ramp so as to be oriented substantially perpendicular relative to said ramp when said ramp is actuated from said stored position to said first ramp position and from said stored position to said second ramp position, said spring fence further adapted to be oriented substantially parallel to said ramp when said ramp assembly is located at said stored position.

14. The automotive vehicle as set forth in claim 9 wherein said ramp cartridge further includes a control module that controls power actuation of said ramp between said stored position, said first ramp position and said second ramp position in response to operator input, and a sensor unit that is adapted to stop actuation of said ramp between said stored position, said first ramp position and said second ramp position in response to a predetermined condition.

15. The automotive vehicle as set forth in claim 9 wherein said passenger area includes a front seating area having a driver's seat and said flat area defined on said floor and adjacent to said driver's seat to receive said mobility device and a rear area having at least one rear passenger seat and said recessed section adapted to receive said ramp cartridge such that said main deck and said flat area are substantially coplanar and having at least one depression to receive a portion of said drive assembly.

16. The automotive vehicle as set forth in claim 9 wherein said ramp cartridge further includes a trolley assembly disposed between said drive assembly and said ramp assembly to facilitate actuation of said ramp and having a sled that actuates said ramp to said first ramp position having a slope no steeper than 1:4 and further includes a carrier that actuates said leading segment in a substantially co-axial configuration relative to said at least one trailing segment to define said second ramp position having a slope no steeper than 1:6.

17. A power-actuated ramp cartridge for use in connection with and received within a passenger area of an automotive vehicle that defines a flat area of a floor of the passenger area adapted to receive a mobility device, said power-actuated ramp cartridge comprising:
a ramp assembly operatively supported by and received within a recessed section of the floor and having a ramp that is adapted to be actuated between a stored position, a first position, and a second position, said ramp including a leading section and a trailing section having a longitudinally extending groove;
a frame assembly having a main deck and cooperating with and being substantially coplanar with the flat area to provide a substantial flatness of the floor and adapted to receive said ramp assembly below said main deck when said ramp is retained in said stored position;
a drive assembly including a motor mounted to said frame assembly, a drivetrain interconnecting said motor to said ramp assembly to actuate said ramp between said stored position, said first ramp position and said second ramp position;
a control module that controls power actuation of said ramp between said stored position, said first ramp position, and said second ramp position in response to operator input and has a sensor unit that is adapted to stop actuation of said ramp between said stored position, said first ramp position, and said second ramp position in response to a predetermined condition; and
a trolley connected to said drive assembly and said ramp to facilitate actuation of said ramp between said stored position and said first and second ramp positions, a portion of said trolley assembly engaging said groove in said leading section of said ramp to facilitate actuation of said ramp between said stored position and said second ramp position.

18. The power-actuated ramp cartridge as set forth in claim 17 wherein said ramp assembly includes a main fence and a spring fence operatively attached to said ramp, said main fence and said spring fence are adapted to be received within said frame assembly when said ramp is in said stored position and deploy in a telescoping manner relative to said frame assembly when said ramp is actuated to said first ramp position, said main fence is adapted to define a short edge barrier during boarding and alighting at said first ramp position, said ramp assembly having at least one tertiary fence that is adapted to be received by said main fence when said ramp is in said first ramp position and further adapted to extend axially outward from said main fence when said ramp is actuated to said second ramp position, said tertiary fence cooperates with said main fence to define a long edge barrier during boarding and alighting at said second ramp position.

* * * * *